United States Patent [19]

Massof et al.

[11] Patent Number: 5,151,722

[45] Date of Patent: Sep. 29, 1992

[54] VIDEO DISPLAY ON SPECTACLE-LIKE FRAME

[75] Inventors: Robert W. Massof, Baltimore, Md.; Donald C. O'Shea, Atlanta, Ga.; Thomas W. Raasch, Baltimore, Md.

[73] Assignee: The Johns Hopkins University, Baltimore, Md.

[21] Appl. No.: 609,243

[22] Filed: Nov. 5, 1990

[51] Int. Cl.$^5$ .................... G02C 1/00; G02C 11/00
[52] U.S. Cl. ...................................... 351/158; 351/41
[58] Field of Search .................... 351/41, 158, 50; 358/93, 108, 113, 88; 2/448, 449, 450

[56] References Cited

U.S. PATENT DOCUMENTS

| 3,582,191 | 6/1971 | Cohen . | |
|---|---|---|---|
| 4,672,436 | 6/1987 | Hawthorne | 358/93 |
| 4,704,000 | 11/1987 | Pekar . | |
| 4,802,756 | 2/1989 | Feinbloom | 351/200 |
| 4,806,011 | 2/1989 | Bettinger | 351/158 |

FOREIGN PATENT DOCUMENTS 1103961  4/1961  Fed. Rep. of Germany ...... 351/158

OTHER PUBLICATIONS

Chung, J. C., Harris, M. R., Brooks, F. P., Fuchs, H., Kelley, M. T., Hughes, J., Ouh-young, M., Cheung, C., Holloway, R. L., Pique, M., (1989), Exploring Virtual Worlds with Head-Mounted Displays, SPIE vol. 1083:42-52, (no month avail.).

Loshin, David S. and Juday, Richard D., (1989), The Programmable Remapper: Clinical Applications for Patients with Field Defects, Optometry and Vision Science, vol. 66, No. 6:389-395, (no month avail.).

Martin, Stephen, W. and Hutchinson, Richard C., (1989), Low Cost Design Alternatives for Head Mounted Stereoscopic Display, SPIE vol. 1083:53-58, (no month avail.).

McLean, Bill and Smith, Steve, (1987), Developing a Wide Field of View HMD for Similators, SPIE vol. 778:79-82, (no month avail.).

Melzer, James E. and Larkin, Eric W., (1987), An Integrated Approach to Helmet Display System Design, SPIE vol. 778:83-88, (no month avail.).

Skenker, Martin, (1987), Optical Design Criteria for Binocular Helmet-Mounted Displays, SPIE vol. 778:70-78, (no month avail.).

Primary Examiner—Rodney B. Bovernick
Attorney, Agent, or Firm—Howard W. Califano

[57] ABSTRACT

A head mounted display is disclosed for providing a monocular or binocular wide field of view. The head mounted display contains a unique configuration and unique folding optics so that it can be worn like a pair of spectacles or goggles. The optics and frame of the goggles are uniquely designed to accommodate different head dimensions.

22 Claims, 5 Drawing Sheets

VIDEO DISPLAY ON SPECTACLE-LIKE FRAME

BACKGROUND OF THE INVENTION

1. Field of the Invention

The present invention relates to a head mounted video display for providing a monocular or binocular wide field of view image. More particularly, the head mounted display contains unique features that allow it to be light-weight, portable and capable of being worn like a pair of spectacles or goggles. The head mounted video display provides a magnified video image that is useful in many fields including aiding the vision of persons with impaired eye-sight.

2. Description of the Prior Art

Despite dramatic surgical and medical advances, most diseases of the eye and the visual system result in permanent visual impairments. More than 11 million people in the U.S. suffer irreversible visual impairments that cannot be corrected medically, surgically, or with eyeglasses. Out of this large group, approximately 2.5 million people have visual impairments so severe that the individual suffers a disability, this condition is called low vision. More than 2% of our population over age 40 have low vision; that is, visual acuity in the better eye is 20/70 or worse (for a much smaller percentage of people, low vision results from limited visual fields, i.e., "tunnel vision"). The percent of people with low vision increases with increasing age, an ominous statistic for the future, given our aging population.

Low vision severely limits or precludes reading, face and object recognition, driving, personal grooming, performance of visually-guided tasks (e.g., assembly work, inspection, design maintenance, etc.), and safe mobility (e.g., street crossing, climbing stairs, etc.). In many cases the limitations on visual functioning, reading in particular, can be lessened with the use of magnifying devices. That is, the limitations on visual performance imposed by low visual acuity often can be overcome by magnifying the image to a scale that is appropriate for the visual acuity. Typically this is accomplished with various types of optical magnifiers, however, in some situations closed-circuit television systems are used to obtain magnification. However, existing closed-circuit television magnification systems use existing television displays which are not portable and which require the low vision patient to scan across a greatly enlarged image on the television screen. A head mounted binocular display, mounted on the head like a pair of spectacles or goggles and providing separate video images to the two eyes for wide field binocular viewing would benefit low vision patients greatly, but is not taught by the prior art.

Similarly, binocular wide-field stereoscopic viewing that provides magnified video images would have application in various fields, including 3-D computer aided design. But, the prior art does not teach a binocular display, mounted on the head like a pair of spectacles or goggles. Head mounted displays in the prior art were developed for military applications and are extremely heavy and either require support by a head frame or are mounted on a helmet.

U.S. Pat. Nos. 3,582,191 and 4,672,436 describe head worn video displays. In each patent the video display is located in front of the subject's head rendering the technology inappropriate for a goggle-like or spectacle-like device. U.S. Pat. No. 4,806,011 discloses a pair of glasses incorporating a microfilm cassette that is used to project an image into the wearers eye. The reference however, does not teach generating a magnified video image.

The following articles discuss head mounted video displays designed for military applications and incorporated into helmet-like structures;

1. "Developing a wide-field of view HMD for Simulator" by Bill McLean and Steve Smith (SPIE vol.778 *Display System Optics* (1987));
2. "An integrated approach to Helmet Display System Design" by James E. Melzer and Eric C. Larkin (SPIE vol.778 *Display System Optics* (1987)
3. "Low Cast Design alteration for Head Mounted Stereoscopic Display" by Stephen W. Martin (SPIE vol.1083 *Three-Dimensional Visualization and Display Technology* (1989).

The devices disclosed in these articles do not teach how to overcome the technical difficulties of incorporating the video display, the folded optics and the object mirror in a goggle-like display. Similarly an article entitled "Optical Design Criteria for Binocular Helmet/Mounted Display" by Martin Shenker (SPIE vol.789 *Display System Optics* (1987) teaches the use of a curved object mirror and a flat beam splitter to present an image to the subject's eye; but, does not disclose the folding optics necessary to incorporate both features onto a goggle-like head mounted display.

An article entitled "Exploring Virtual Worlds with Head Mounted Displays" by J. C. Chung et. al (SPIE vol.1083 *Three Dimensional Visualization and Display* (1989)) explores the usefulness of head mounted displays in various fields; but the article does not teach how to design a goggle-like head mounted display. Similarly, an article entitled "The Programmable Remapper Clinical Application for Patients with Field Defects" by David S. Loschin and Richard D. Juday (*Optometry and Visual Science,* vol.66 #6, pages 389-395) teaches the advantages to low vision patients that could be provided by a goggle-like head mounted display, but does not suggest a practical design for such a goggle-like head mounted display.

SUMMARY OF THE INVENTION

The present invention is a binocular video display, mounted on the head like a pair of spectacles or goggles, that can provide separate video images to the two eyes for wide field binocular viewing. The device is portable and lightweight, overcoming the weight and size limitations in the prior art military helmets. The functional improvements of the present invention over the prior art, is found in the optical design which satisfies the requirements of it being binocular, presenting a separate video image to each eye, being lightweight, providing a wide field of view, being portable, and capable of being worn like a pair of spectacles or goggles.

The present inventors recognized that for a goggle-like video display, only a small portion of the optics should be placed in front of the subject's head. Therefore, only a beam splitter and curved object mirror are placed in front of each eye. The curved object mirror is positioned on axis with the eye to relay and focus the magnified video image on the retina. The present inventors also recognized the advantage from both the weight and human engineering point of view of placing the video display for each eye in the side arm of the goggle. The present invention places a small miniature cathode ray tube (CRT) in each side arm of the goggles. The inventors also developed unique folding optics to couple the image generated by the CRT into the plane of the curved object mirror. The folding optics provide four unique features: (1) relaying the CRT image to the focal plane of the curved mirror so that a video display image at the subject's far point will be provided to the subject; (2) magnifying the small video image produced by the CRT so that it substantially fills the entire curved mirror, so that a wide field of view image will be produced; (3) reduce image vignetting by producing an optical system having sufficient aperture so that the exit pupil of the optical system is at the center of rotation of the eye; and, (4) providing a region for incorporation of lenses to correct the user's refractive error.

The invented head mounted video display generally comprises: a video display, such as miniature CRT, mounted along the side of the head and positioned in the side arm of the goggles; a curved mirror positioned in front of the subject's eye as the final optical element for presenting the video image to the user; and, a folded optics design as a means for optically relaying a CRT image into the plane of the curved mirror. The folded optics means includes a beam splitter positioned between the subject's eye and the curved mirror for presenting the light from the video display into the plane of the curved mirror. The folded optics means also includes optics for magnifying the image to provide a full field of view into the user's eye. The goggles and optics cooperate so that the goggles can be uniquely adjusted to each user's head dimensions. A change in physical dimensions of the goggles being compensated by a change in a distance between optical elements. The optical elements can also be modified, in this unique design, to compensate for the user's individual refractive error. In this manner, each goggle can be uniquely configured to the physical dimensions and visual needs of each user.

The invention can operate in either the monocular or binocular modes. When operating in the binocular mode, images with slight spatial disparity can be presented to the each eye so that stereoscopic vision will result. The present invention is therefore uniquely configured to provide stereoscopic full field video images to a subject and has application in treating vision impaired patients as well as providing an optical tool for 3-D computer design applications and other visual simulations.

BRIEF DESCRIPTION OF THE DRAWING

FIG. 2a shows the side view looking from the inside and FIG. 2b shows the top view of the bottom arm.

DETAILED DESCRIPTION OF THE PREFERRED EMBODIMENTS

Figure 1:
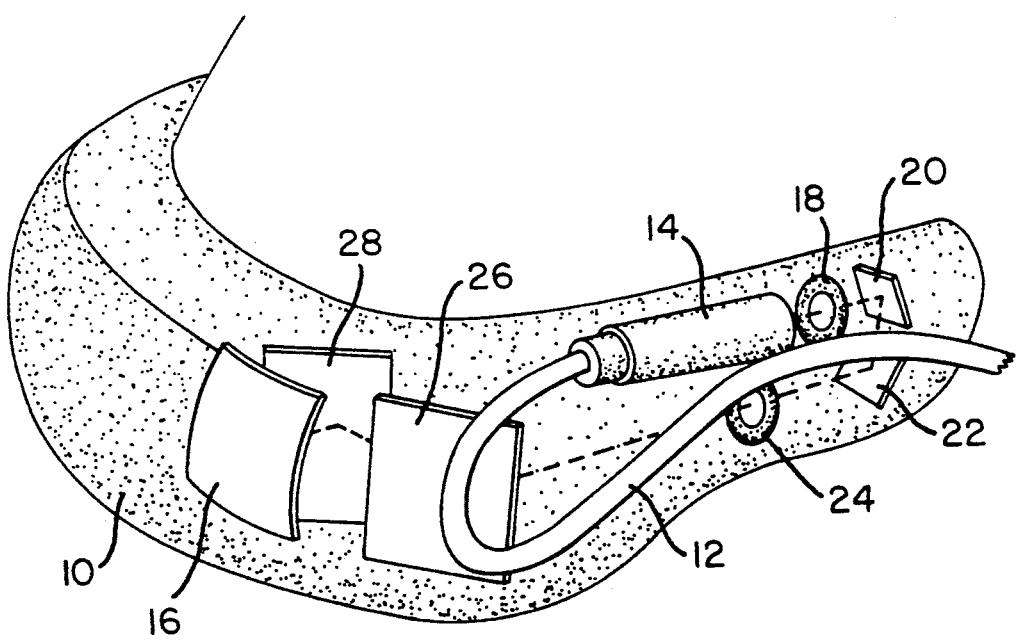
FIG. 1 is a three dimensional view of the invented video display showing the placement of the CRT, the folding optics, and the curved object mirror in a goggle-like frame.

FIG. 1 is a three dimensional view of a head mounted display as taught by the present invention. The head mounted display comprises lightweight and compact goggles 10, worn on the subject's head, that receives a video signal via cable 12. The video signal carried by cable 12 may be from various sources including, but not limited to: video cameras, broadcast television receiver, video recorders (VCR) and computers (computer generated video images). The head mounted display comprises: 1) a means for generating the video image 14, generally a CRT, positioned along the subject's head and within the side piece of the goggles; 2) image folding optics for magnifying the video image to substantially fill the concave mirror 16 and for relaying the video image to the focal plane of the concave mirror 16; and, 3) the curved mirror 16 positioned in front of and on-axis with the eye. The image folding optics is contained within the goggle structure and includes collimating lens 18, two front surface mirrors (20, 22), an imaging lens 24, a concave mirror 26 and a beam splitter 28. This unique configuration, only shown in FIG. 1 for the left eye, may be duplicated for the right eye. If spatially disparate video images are presented to the right and left eyes, stereoscopic video would result.

Figure 2A:
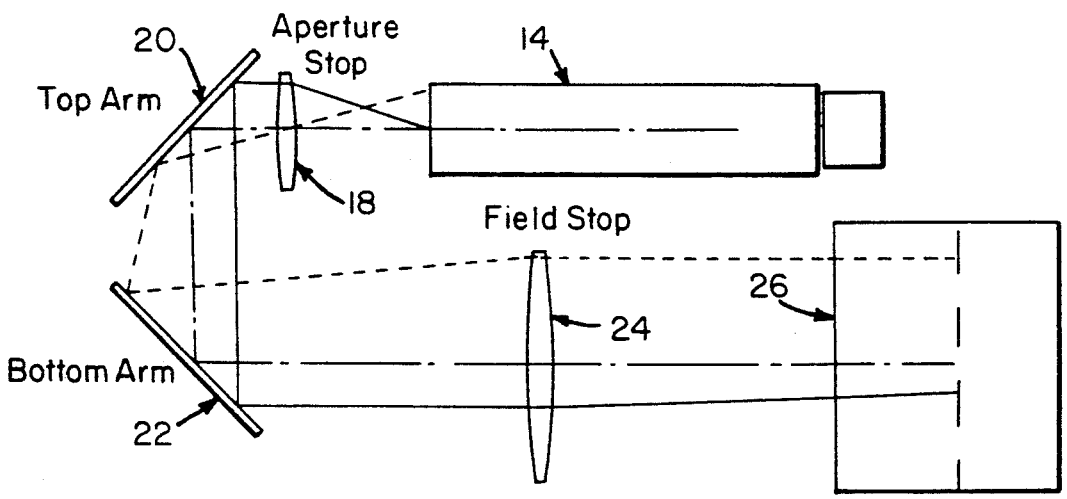
FIGS. 2a and 2b show a ray trace of the folding optics as taught by the present invention.
Figure 2B:
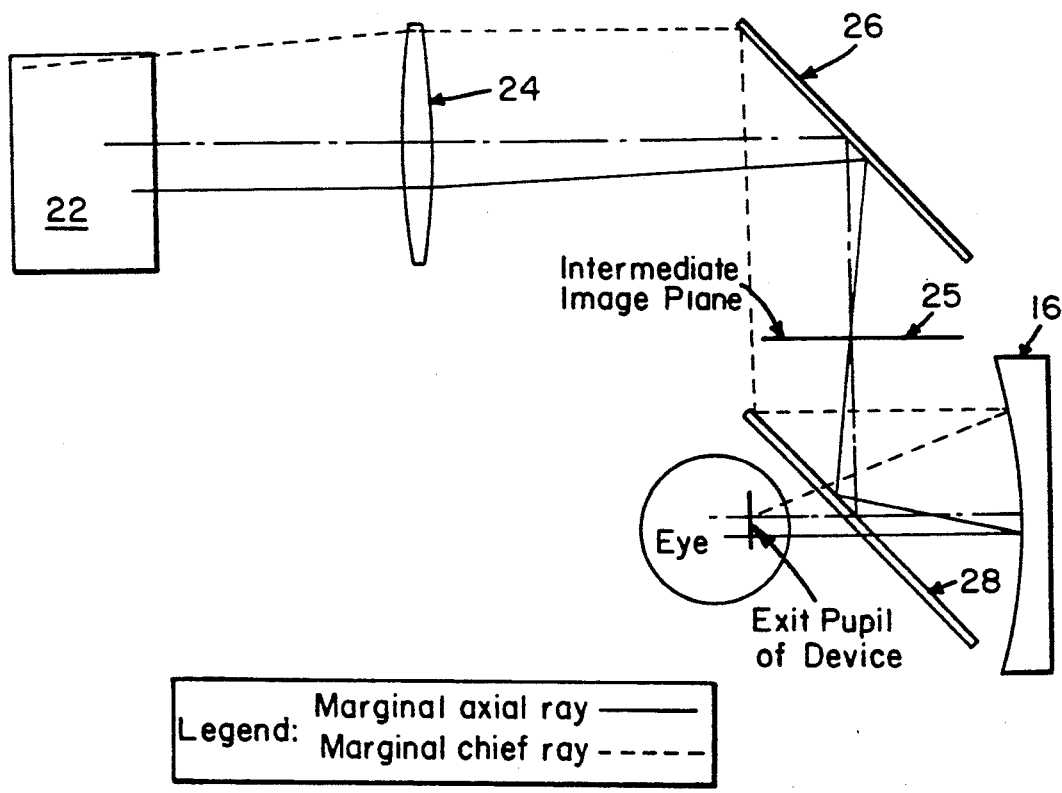

The image folding optics can best be described by looking at FIGS. 1 and 2 in combination. The collimating lens 18 is positioned one focal length ($f_1$) from CRT 14. This produces a collimated beam for each point of the object and an image of the CRT is located at infinity. Subsequent analysis will show that the collimating lens 18 is the aperture stop of the system. To enable all necessary components to be enclosed in the compact enclosure 10 of the goggle and to produce a correctly oriented and presented image, two first surface mirrors (20, 22) are used to direct the collimated light to the imaging lens 24. In some embodiments these mirrors may be dispensed with. Their presence or absence depends only on the needs for packaging in the most convenient manner and are not crucial to the operation of this device. An alternative embodiment will be given later. The imaging lens 24 with focal length $f_2$ creates an intermediate image 25 of the CRT. Although this lens will produce an image of the CRT no matter where it is located in the collimated light from lens 18, if it is located one focal length $f_2$ away from the collimating lens it will image the aperture stop (i.e. lens 18) at infinity. This choice when coupled with the subsequent optics places an image of the aperture stop and thus exit pupil at the entrance pupil, close to the center of rotation of the eye. This prevents any vignetting of the image when the eye rotates to view off-axis parts of the field. To assure that all but the very edge of the CRT 14 screen is presented to the eye, the imaging lens must be large enough to pass the chief ray at the edge of the CRT. Thus the imaging lens 24 is the field stop of the system. One focal length $f_2$ beyond the imaging lens 24 is an intermediate image 25. In order for the video image to appear at optical infinity, the curved mirror 16, focal length $f_3$, must provide collimated light to the eye. To accomplish this, the distance between the imaging lens 24 and the curved mirror 16 must equal the sum of the focal length of the imaging lens 24 ($f_2$) and the focal length ($f_3$) of the curved mirror 16. To direct the light to the eye, a first surface mirror 26 intercepts the light and directs it to a beamsplitter 28, which in turn reflects it away from and essentially along the optical axis of the eye to the curved mirror 16. Since the distance from the intermediate image to the curved mirror is essentially collimated and the image is at infinity, upon transmission through the beamsplitter 28, the eye is presented with an image at infinity. Another consequence of locating the imaging lens 24 one focal length $f_2$ from the collimating lens 18 is that the chief ray from each point is parallel to the axis, so there is a one-to-one correspondence between a point on the CRT 14 and a point on the curved mirror 16. Thus to assure that the entire CRT image is transmitted, another requirement on the optical design of the system is that the curved mirror 16 be larger than the field stop (i.e., the imaging lens 24). By choosing the focal lengths of the collimating ($f_1$) and image ($f_2$) lenses such that their ratio is that of the ratio of the diameters of the CRT 14 and the curved mirror 16, one is assured that the field stop and the curved mirror will collect and direct the entire CRT image and provide the widest field of view possible.

The optics design, as taught by the present invention, allows the video goggles to be customized for each subject. To assure fusion of a stereoscopic image, the distance between the separate left and right curve mirrors 16 must be adjustable. The design permits each mirror to be independently positioned on-axis with the subject's eye. The design also permits correction for each subject's refractive error by the placement of additional lenses in the spectral plane or the conjugate spectacle plane. As shown in FIG. 2, additional lenses 30 can be placed in the optical path of each eye to correct for the refractive error of that eye. This enables the large scale manufacture of the basic device to be combined with custom fitting to a specific subject's vision correction. It also permits a device that can be worn without the impediment of fitting around conventional glasses.

Figure 3:
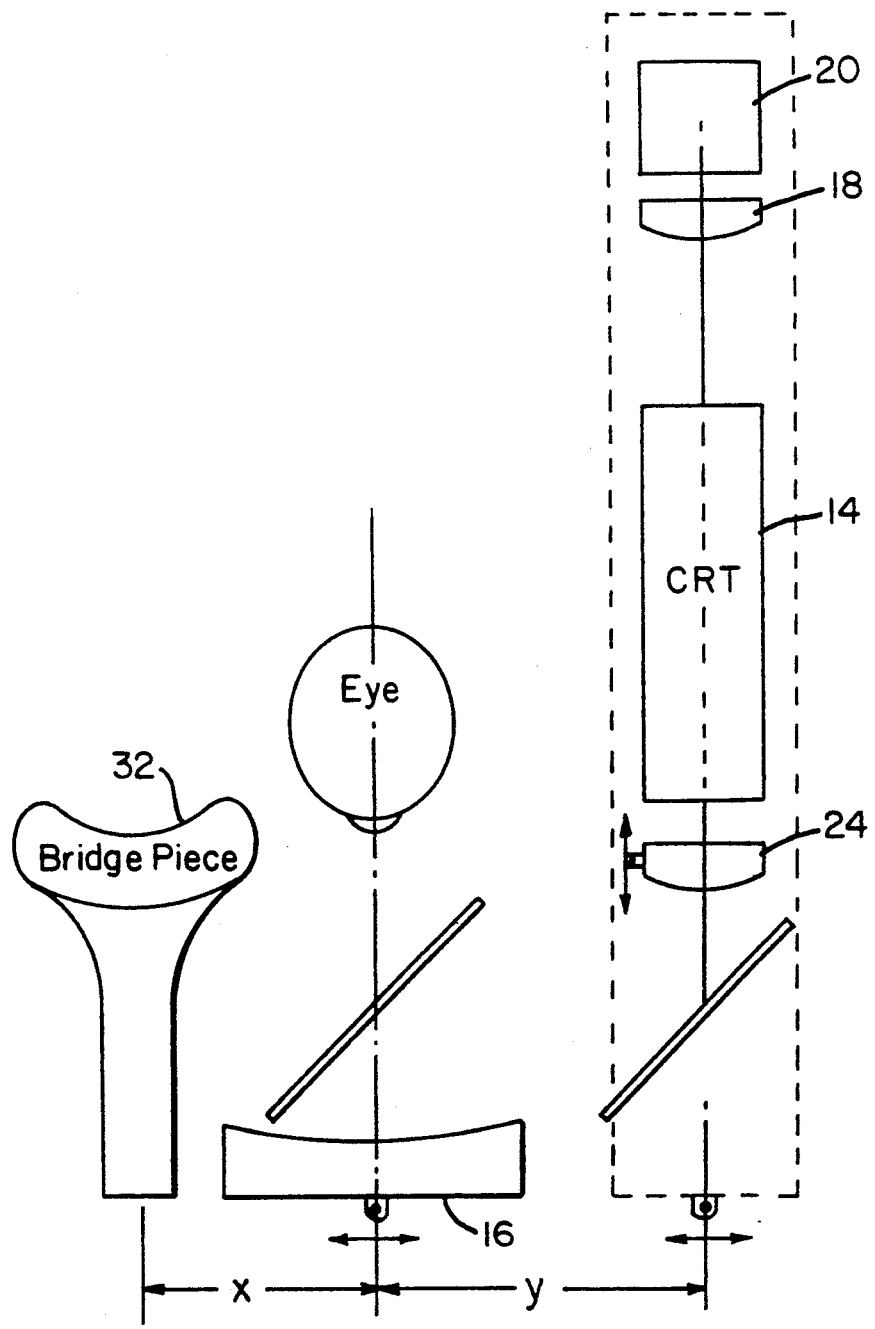
FIG. 3 is a top view of the present invention showing physical and optical variations necessary to conform the goggles to a particular subject.

In addition, the video goggles can be adjusted for different head dimensions. This feature is best shown in the top view of the optics appearing in FIG. 3. The following discussion will focus on the optics for the left eye, but it is to be understood that an identical arrangement can be used with the right eye. As discussed previously, the distance "x" which separates the bridge piece 32 from the center of the object mirror 16 is adjustable, allowing the mirror to be placed on axis with the subject's eye. In addition, the distance "y" between the axis of the curved object mirror 16 and the optical axis of the CRT 14 (which is generally parallel to the subject's head) is adjusted so that the goggles can conform to the physical dimensions of the subject's head. If "y" is increased, the distance between imaging lens 24 and the side mirror 26 is correspondingly decreased. (Note: corresponding movement of the imaging lens 24 closer to, or away from, the collimating lens 18 is possible since the light between the imaging lens 24 and the collimating lens 18 is collimated.) The distance of the optical path between the imaging lens 24 and the curved object mirror 16 is maintained constant, and the curved mirror 16 will generate an image appearing at optical infinity to the subject's eye.

Figure 4:
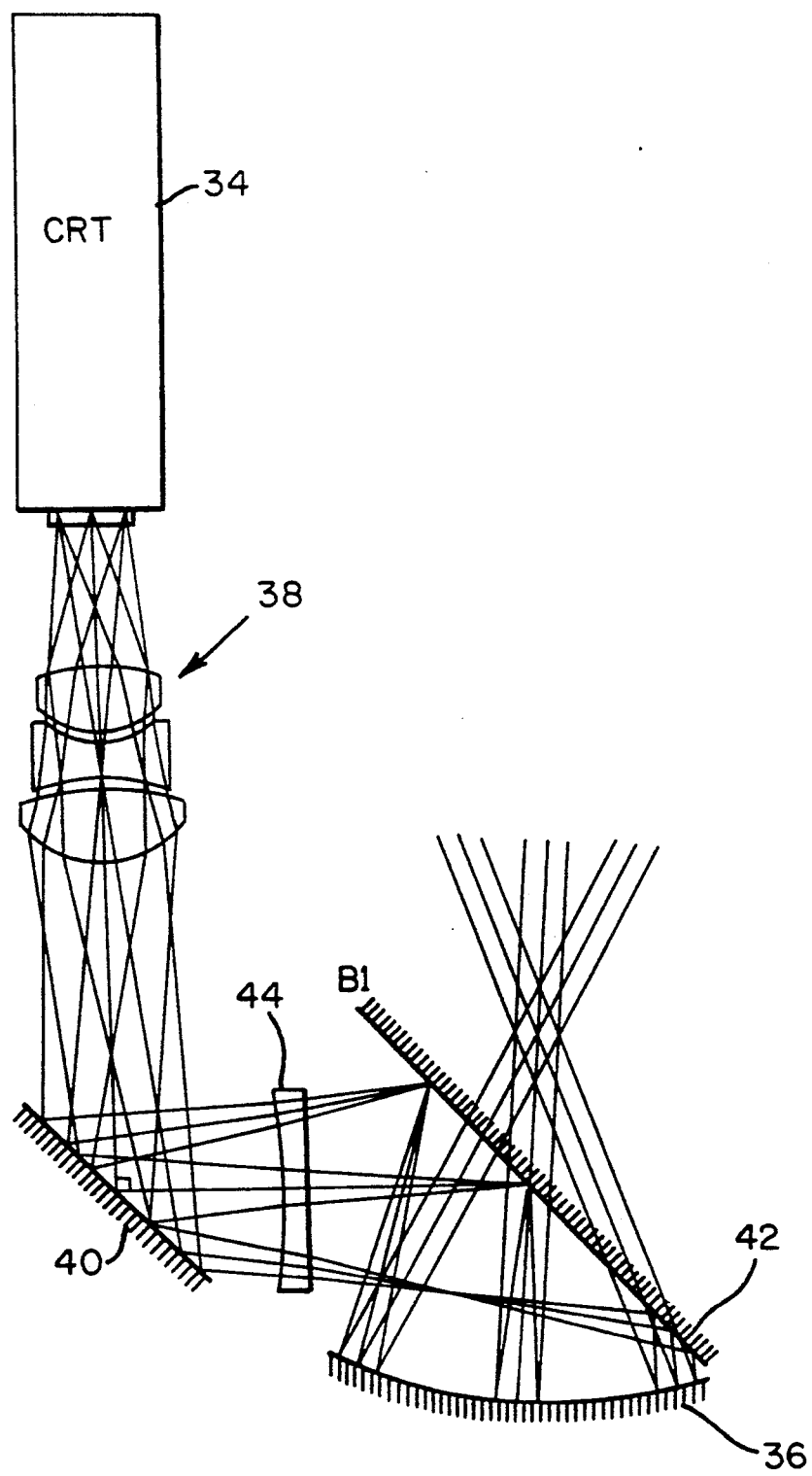
FIG. 4 shows a ray tracing of an alternative embodiment of the present invention.

FIG. 4 is a top view of an alternative embodiment as taught by the present invention. FIG. 4 illustrates the optics for the right eye, but it is to be understood that similar optics can be used with the left eye. As with the embodiment described earlier in the specification, the video source 34 is positioned along the side the head and in the side piece of the goggles (not shown). The video source 34 may be a CRT, a liquid crystal display, a CCD light valve, an optical fiber, or any other lightweight small object source. As in the earlier discussed embodiment, curved mirror 36 is also positioned in front of and on-axis with the eye. The curved mirror 36 provides a magnified video image at the user's far point. Image folding optics couples the CRT to the curved mirror 36 by: 1) relaying the CRT image to the focal plane of the curved object mirror 36; and 2) magnifying the small video image produced by the CRT so that it substantially fills the object mirror 36. Image magnification by the image folding optics is necessary so that the video image will produce a wide field of view; a field of view of 50° or more is desirable. The combination of a wide field of view and the video object appearing at infinity provides a realistic image for the subject.

The image folding optics includes: 1) relay optics 38, which magnifies the image produced by the video source 34; 2) a front surfaced mirror 40 and a beam splitter 42 for folding the image onto the plane of the curved mirror 36; and 3) a pupil aberration correcting lens 44. The high power lens included in the relay optics 38 produces distortions and aberrations. Curved mirror 36 is designed to add distortions that are the inverse of distortion produced by the relay optics 38.

The relay optics 38 is designed to minimize vignetting, that is to minimize a portion of the video image from being cut off by the eye pupil as the subject scans the object appearing on the curved object mirror 36. To accomplish this feature, the relay optics is designed to produce an optical system having sufficient aperture so that the exit pupil of the optical system is at the center of rotation of the eye.

Figure 5:
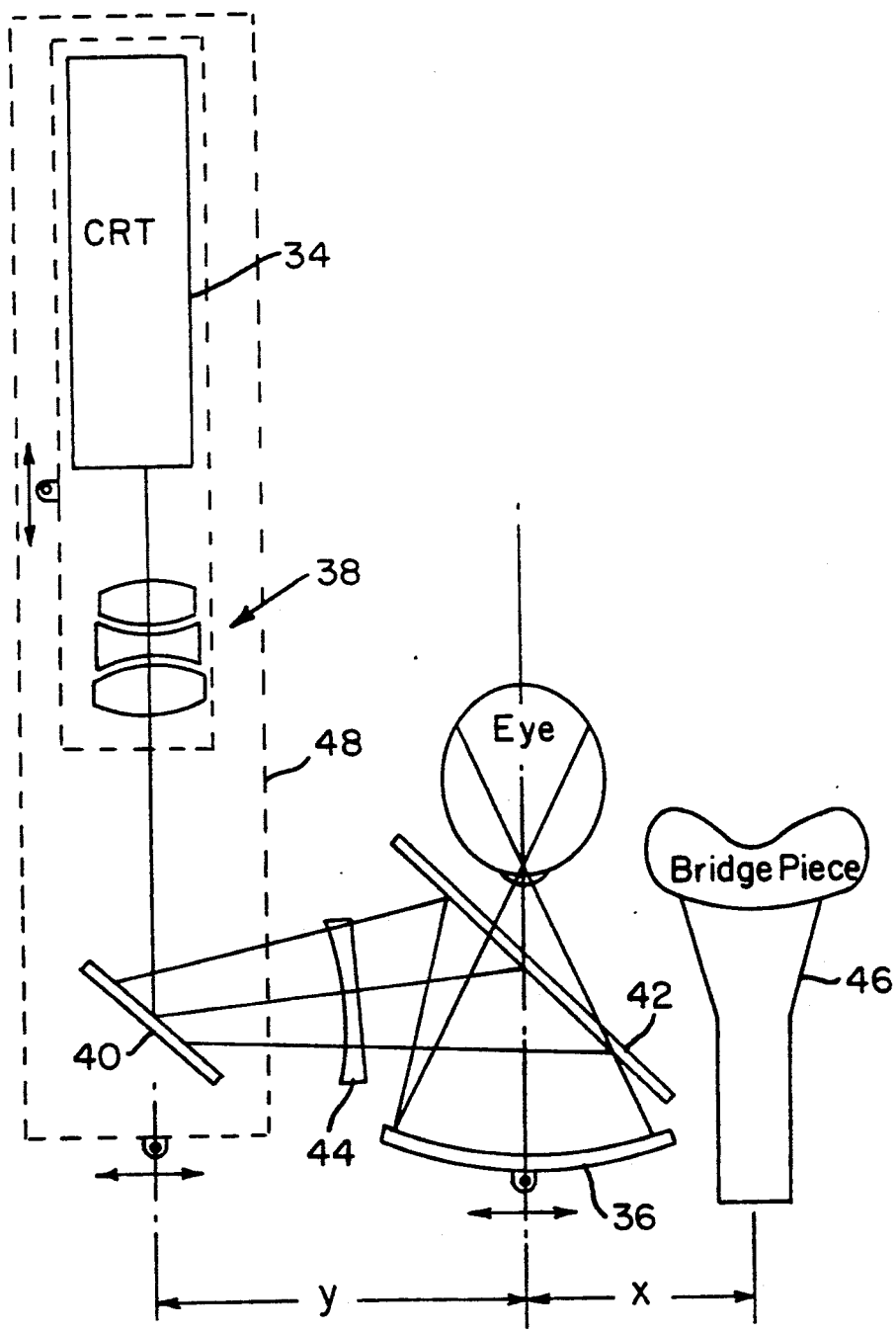
FIG. 5 is a top view of the alternative embodiment showing physical and optical variations necessary to conform the goggles to a particular subject.

The embodiment shown in FIG. 5 also allows the invented video goggles to conform with facial dimensions. The distance "x" between the bridge piece 46 and the axis of the curved mirror 36 is adjusted so that the curved mirror 36 is on-axis with the subject's eye. This adjustment is critical to assure fusion of the left and right images. The distance "y" between the axis of the curved mirror 36 and the side piece of the goggles, which contains the optical axis of CRT 34, is adjustable to accommodate different head shapes. If the distance "y" is increased, then the CRT 34 and the relay optics 38 are moved forward a corresponding distance as an entire assembly, thereby maintaining the desired optical path length. The video goggles also provide a means to correct the subject's refractive error by inserting corrective lens 48 between the triplet 38 and the folding mirror 40.

The head mounted display is uniquely configured to be worn as part of a spectacle-like or goggle-like frame. Low weight requirements can easily be achieved by using plastic components. The CRT video display used in the prototype design was mounted in a 0.75" by 3.5" tube positioned in the arm of the goggles. The only system components in front of the eyes are the beam splitter and the curved optical mirror. All other system components required to present the video image into the plane of the curved object mirror (including the video CRT) are mounted on the side of the head (in the arms of the goggles) thereby satisfying the requirements of being mounted in a spectacle-like or goggle-like frame. For the prototype design, the curved object mirrors and beam splitters for the two eyes are mounted on a plastic frame, attached to a brow piece, supported on the bridge of the nose. As discussed earlier, the separation between the curved object mirrors is dictated by the inter pupillary distance of the user. The video CRT and the rest of the optical system can be mounted in a separate plastic frame, forming the side arms of the goggle. Generally, this section is perpendicular to the brow piece, and rests against the users temple. The plastic frame housing the CRT and optical components can be supported by compressible pressure pads against the users head, and along the length of the plastic frame and/or a strap or other support behind the head.

In operation, the head mounted display is worn on the head like a pair of spectacles or goggles. When used as a binocular display separate video images are provided to the two eyes for wide field stereoscopic viewing. The stereoscopic pair of video images are generated by two video CRT displays; one positioned in association with the right eye and the other positioned in association with the left eye. Because of the disparity between the stereoscopic pair of images, the user of the binocular head mounted display will see a video image in depth; with a large field of view. This stereoscopic display will provide commercial users of computer displays (such as 3-D computer-aided design) and 3-D stereoscopic television with a comfortable and attractive alternative to limited current devices. As will be discussed later, it will be an attractive solution to problems of persons with low vision.

Alternatively, the head mounted display can provide a monocular display for the right eye or a monocular display for the left eye. For monocular display choices, the unused channel would contain the same optical components that are included in the binocular system, with a dummy component of the same weight and size substituted for the video display.

A variation on this design provides "see-through" display capabilities. If the current object mirrors are semi-silvered, the video display will be seen superimposed on the outside view. If only part of the curved mirror is silvered and the rest is transparent, with appropriate scaling and magnification and image positioning, the user will see a partitioned field, part of which is the video display, the other part of which is the outside view. In these instances, the back surface of the curved object mirror has a curvature that nullifies the refractive power of the front surface of the mirror.

Although the head mounted display has many potential uses it was uniquely designed to address the needs of low vision impairment. Approximately 2.5 million people have visual impairments so severe that the individual suffers a disability. Limitations on visual performance imposed by low visual acuity often can be overcome by magnifying the image to a scale that is appropriate for the visual acuity. The head mounted display can be used in association with a head mounted or remote video camera and associated electronics to electronically magnify an image for display to the patient. The head mounted display will enable a low vision patient to: 1) watch television; 2) read, using a magnified image; 3) view an enhanced image through reverse video and other electronic techniques; and, 4) view output generated by a computer.

Other forms of low vision result from limited visual fields (i.e. "tunnel vision") or distorted vision caused by macular degeneration, glaucoma, diabetic retinopathy, retinal detachment, or other retinal and optic nerve diseases. The head mounted display in association with a video camera and imaging electronics can be used to re-map the image so that it overcomes the distortions provided by the eye. In addition, wide field magnification, enhanced contrast, reverse video, and image brightness can be electronically controlled to enhance the patient's vision.

Obviously, many modifications and variations of the present invention are possible in light of the above teachings. It is therefore to be understood that within the scope of the appended claims, the invention may be practiced otherwise than as

What is claimed is:

1. A head mounted video display, comprising:
   a goggle like frame having side arms adapted to run alongside the users head;
   a curved mirror secured to said frame and adapted to be positioned in front of a user's eye to relay and focus a video image onto the retina;
   a small video display positioned in said side arm for generating a video image; and,
   folding optics means for placing a magnified intermediate image of said video display into the focal plane of the curved mirror, so that an image of said video display subtending a large visual angle will be focused on the user's retina.

2. The display of claim 1, wherein said folding optics means includes a beam splitter adapted to be positioned between the user's eye and said curved mirror for presenting the video image generated by said video display into the focal plane of the said curved mirror.

3. The display of claim 2, wherein said folding optics means further includes an optics means for magnifying the video image so that the image of the video display on the retina of the user's eye substantially fills the entire curved mirror, thereby producing a wide field of view.

4. The display of claim 3, wherein said head mounted display further comprises an optical element inserted into said folding optics means for correcting the user's individual sphero-cylindrical refractive error, thereby changing the plane of the intermediate image to produce the correct vergence at the patient's eye.

5. The display claim 3, wherein said folding optics means comprises an optical system having sufficient aperture so that the exit pupil of said optics means is large relative to the pupil of the user's eye and is imaged close to the center of rotation of the user's eye thereby preventing image vignetting with eye movements.

6. A head mounted display, comprising:
   a frame adapted to be placed on a user's head and worn like goggles and having a bridge piece and side arms that extend along a user's head;
   a curved mirror mounted onto said frame so that said curved mirror is positioned in front of and on-axis with the user's eye when said frame is worn by the user;
   a video display mounted on the arm of said frame for producing a video image; and,
   a folding optics means mounted onto said frame for placing a magnified intermediate image produced by said video display into the plane of said curved mirror, so that an image of said video display subtending a large visual angle will be focused on the user's retina, said folding optics means including,
   a beam splitter mounted on said frame so that it is positioned between said curved mirror and the user's eye when said frame is worn by the user,
   an image relaying mirror mounted on said frame adjacent to said beam splitter and cooperating optically with said beam splitter for folding the video image from a plane running substantially parallel to said side arm into the focal plane of said curved mirror, and an optical means for magnifying the video image so that it substantially fills said curved mirror.

7. The display of claim 6, wherein said optical means includes;

a collimating lens means positioned a focal length from the video display for producing a collimated beams; and, an imaging lens means positioned along the optical path from said collimating lens for focusing an intermediate image onto the focal plane of said curved mirror the distance between the collimating lens means and the imaging lens equals the focal length of the imaging lens means and, the distance between said imaging lens means and said curved mirror equals to the focal length of said imaging lens means plus the focal length of said curved mirror.

8. The display of claim 7, further comprising a corrective lens means inserted into said collimated beam for correcting refractive error of the user.

9. The display of claim 7, when said curved mirror is adjustably mounted onto said frame, permitting the distance between said bridge piece and said curved mirror to be adjusted so that said curved mirror can be positioned on-axis with the user's eye.

10. The display of claim 7, wherein said frame includes an adjustment means so that the distance between said curved mirror and said side arm is adjustable to accommodate different head dimensions, and wherein said imaging lens means is also adjustably mounted so that as the distance between said beam splitter and said image relaying mirror is increased to accommodate head dimensions, the distance between said imaging lens means and said image relaying mirror is correspondingly decreased so that the image generated by said display will be presented to the user's retina.

11. The display of claim 6, wherein said optical means includes, relay optics means positioned between said video display and said image relaying mirror for magnifying the video image; and an aberration correcting lens for correcting any distortions produced by said relay optics means.

12. The display of claim 11, wherein said curved mirror is configured to add distortions that are inverse to the distortions produced by said relay optics means.

13. The display claim 11, wherein, said relay optics means has sufficient aperture so that the exit pupil of the display is not vignetted from rotations of the user's eye.

14. The display of claim 11, wherein said curved mirror is adjustably mounted onto said frame, permitting the distance between said bridge piece and said curved mirror to be adjustable, so that said curved mirror can be positioned on-axis with the user's eye.

15. The display of claim 11, wherein said side arm includes an adjustment means so that the distance between said curved mirror and said side arm is adjustable to accommodate different head dimensions, and wherein said relay optics means and said video display are also adjustably mounted and movable as a unit so that as the distance between said beam splitter and said relaying mirror is increased to accommodate head dimensions, the distance between said relay optics means and said video display, as a unit, and said image relay mirror is correspondingly decreased so that the image generated by said display will be presented to the user's retina.

16. The display of claim 11, further comprising an optical correction means inserted between said relay optics means and said image relaying mirror for correcting refractive error of the user.

17. A binocular head mounted display, comprising:

a frame adapted to be placed on a user's head and worn like goggles and having a bridge piece and side arms that extend along the user's head;

a first curved mirror mounted onto said frame so that said curved mirror is positioned in front of and on-axis with the user's left eye when said frame is worn by the user;

a second curved mirror mounted onto said frame so that said curved mirror is positioned in front of and on-axis with the user's right eye when said frame is worn by the user;

a first video display for generating a video image for the left eye; and a second video display for generating a video image for the right eye;

a first folding optics means mounted on said frame for placing a magnified intermediate image produced by said first video display into the plane of said first curved mirror, so that an image of said video display subtending a large visual angle will be focused on the user's retina, said first folding optics means including, a first beam splitter mounted on said frame so that it is positioned between said first curved mirror and the user's left eye when said frame is worn by the user, for presenting the video image into the optical plane of said first curved mirror, and a first optical means for magnifying the video image produced by said first video display so that it substantially fills said first curved mirror; and a second folding optics means mounted on said frame for placing a magnified intermediate image produced by said second video display into the plane of said second curved mirror, so that an image of said video display subtending a large visual angle will be focused on the user's retina, said second folding optics means including, a second beam splitter mounted on said frame so that it is positioned between said second curved mirror and the user's right eye when said frame is worn by the user, for presenting the video image into the optical plane of said second curved mirror, and a second optical means for magnifying the video image presented by said second video display so that it substantially fills said second curved mirror.

18. A method of treating impaired vision, comprising using a head mounted display to present a video image to one or both eyes of a patient; said head mounted display having, a goggle like frame with side arms adapted to run alongside the user's head, a curved mirror secured to the frame and adapted to be positioned in front of the patient's eye to relay and focus a video image onto the retina, a small video display positioned in said side arm for generating a video image, and folding optics means for placing a magnified intermediate image of said video display into the focal plane of said video display subtending a large visual angle on the patient's retina; and supplying a video signal to the head mounted display which is electronically processed to present a magnified or enhanced image.

19. The method of claim 18, wherein the video signal is provided by broadcast television.

20. The method of claim 18, wherein the video signal is provided by a video camera focused on written material.

21. The method of claim 18, wherein the video signal is provided by a computer so that the head mounted display acts as the computer display.

22. The method of claim 18, wherein a signal of a reversed video image is presented to the head mounted display to enhance contrast.

* * * * *